Feb. 11, 1969 S. F. CLARKE ET AL 3,427,555

PULSE GENERATORS

Filed Nov. 12, 1965

Inventors:
Stanley Frederick Clarke,
Stuart Norman Radcliffe
and
Anthony John Reeves
BY Baldwin & Wight
ATTORNEYS United States Patent Office 3,427,555

Patented Feb. 11, 1969

3,427,555
PULSE GENERATORS

Stanley Frederick Clarke, Stuart Norman Radcliffe, and Anthony John Reeves, Essex, England, assignors to The Marconi Company Limited, London, England, a British company Filed Nov. 12, 1965, Ser. No. 507,502
Claims priority, application Great Britain, Nov. 18, 1964, 47,039/64
U.S. Cl. 328—59 9 Claims
Int. Cl. H03k 3/04

ABSTRACT OF THE DISCLOSURE

An adjustable pulse generator includes two triggerable monostable delay circuits, each including a capacitance the rate of charge of which determines the delay provided by the circuits and a resistance, the resistances forming part of a potentiometer, which may be adjusted to vary the rates of charge whilst maintaining the sum of the reciprocals of the two charging currents substantially constant.

Figure 1:
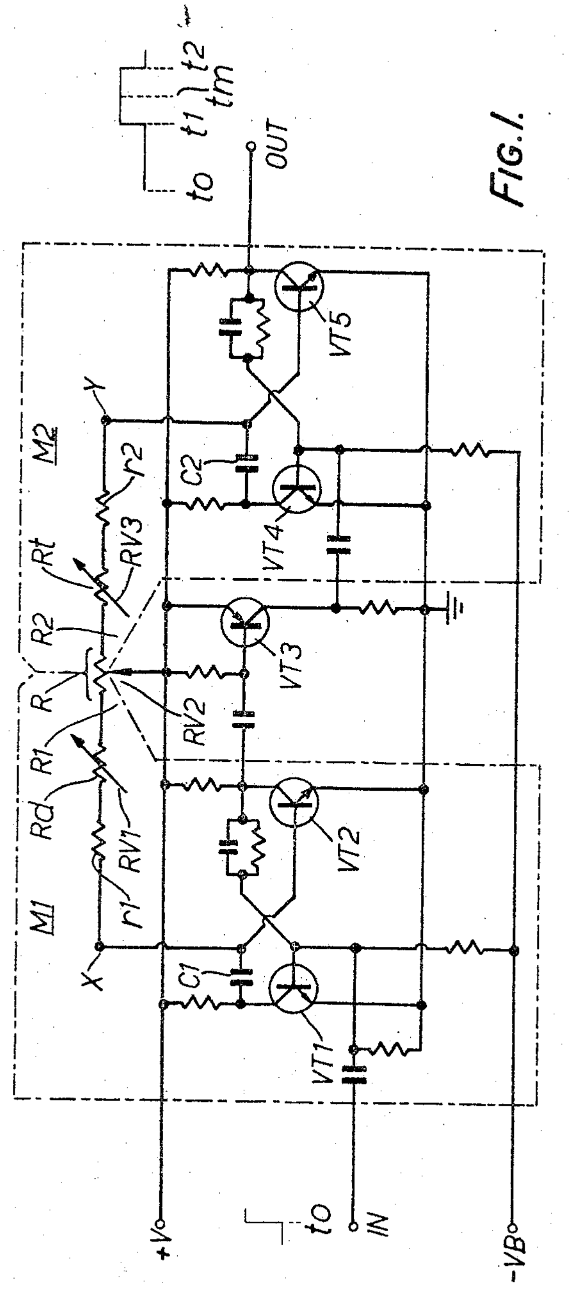

This invention relates to pulse generators and has for its object to provide improved and simple pulse generators which shall be such that desired control of the timing of an edge or edges of the produced pulses can be readily adjusted without introducing other undesired timing changes.

In certain forms of radar system it is desired to vary the width of a pulse without changing the timing of the middle of the pulse, i.e. it is desired to bring the leading and trailing edges of a pulse closer together or further apart symmetrically with regard to the center line of the pulse. The invention enables this requirement to be satisfied. In other cases it may be required to vary the timing of only the leading edge of a pulse or only the trailing edge of a pulse or to vary the timing of the edges other than symmetrically with respect to the center line. The invention may be used to satisfy any of these different requirements of adjustment without involving any other undesired change of timing, though probably the most important and valuable of the applications of the invention is that first mentioned, namely, adjustment of the width of a pulse without change in the timing of the pulse center line. The invention enables this adjustment—which is difficult to achieve reliably and easily by known means—to be achieved by adjustment of a single variable element. As will be apparent later the invention lends itself admirably to adjustment by remote control.

According to this invention an adjustable pulse generator comprises a first triggerable monostable delay circuit including a capacitance the rate of charge of which determines the delay provided by said circuit; a second triggerable monostable delay circuit also including a capacitance the rate of charge of which determines the delay provided by said second circuit; and means for varying the rates of charge while maintaining the sum of the reciprocals of the two charging currents substantially constant.

Preferably the two charging currents are arranged to flow respectively through the two parts of a potentiometer on either side of an adjustable tap thereon adjustment of which varies said currents while maintaining the sum of their reciprocals substantially constant.

In one form of pulse generator in accordance with the invention and adapted to provide a pulse the timing of the leading and trailing edges of which can be symmetrically varied with respect to the timing of the pulse center line the capacitance in the second monostable delay circuit is made twice the value of the capacitance in the first monostable circuit and resistances in the charging current circuits are included in the two parts of a potentiometer on either side of an adjustable tap thereon adjustment of which varies the pulse width without varying the timing of the pulse center line. In a variation of this embodiment an additional variable resistance, adjustment of which will adjust the timing of the pulse center line without varying the width of the pulse, is included in that part of the potentiometer through which flows the charging current for the capacitance in the first monostable delay circuit.

In another form of pulse generator in accordance with the invention and adapted to provide a pulse the timing of the leading edge of which can be adjusted, the value of the two capacitances, one in each monostable delay circuit, is made the same and resistances in the charging current circuits are included in the two parts of a potentiometer on either side of an adjustable tap thereon adjustment of which varies only the timing of the leading edge of the pulse. In a variation of this embodiment an additional variable resistance, adjustment of which will adjust the timing of the trailing edge of the pulse without varying the timing of the leading edge, is included in that part of the potentiometer through which flows the charging current for the capacitance in the second monostable delay circuit.

It is not essential, in carrying out the invention, to make the value of the capacitance in the second monostable delay circuit either equal to or twice the value of that in the first and some other ratio of capacitance may be chosen. If, however, another ratio of capacitance is chosen variation of pulse width symmetrically about the pulse center line (as is obtainable, as above set forth, if the capacitance in the second monostable circuit is twice that in the first) or variation of the timing of the pulse leading edge independently of the timing of the pulse trailing edge (as is obtainable when the two capacitances are equal) will not be obtained.

Remote control may be obtained in all the foregoing embodiments by including an amplifier (preferably a transistor) in each of the two parts of the potentiometer on either side of the adjustable tap thereon, locating the adjustable element (or elements) at a remote point, and providing a suitable operating potential source in a load connecting the adjustable tap (at the remote point) to the control points of the amplifiers—in the case of transistors to the bases thereof.

Preferably a buffer stage is provided between the two monostable delay circuits.

Figure 2:
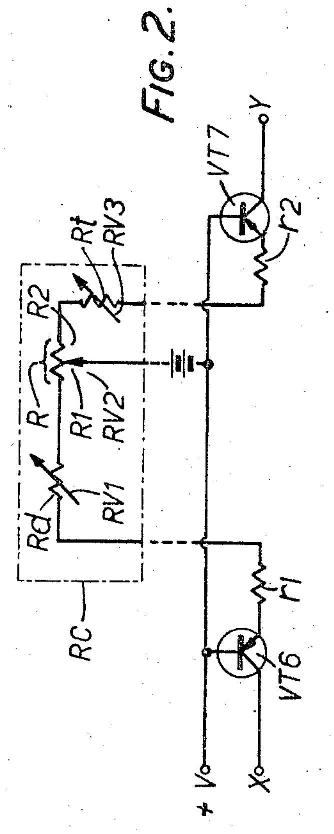

The invention is illustrated in the accompanying drawings in which FIGURE 1 is a circuit diagram and FIGURE 2 illustrates the preferred way in which the circuit of FIGURE 1 can be modified for remote control. The circuit of FIGURE 1 is the circuit of a number of embodiments, different results being obtainable by different element dimensioning.

Referring to FIGURE 1 the chain line block referenced M1 enclosed a triggerable monostable delay circuit of a type known per se and including a capacitance $C_1$ the charging current of which determines the delay the circuit provides. Chain line block M2 encloses a similar triggerable monostable circuit including a capacitance $C_2$ the charging current of which determines the delay of this circuit. The monostables M1 and M2 are of the transistor type and each includes two transistors VT1 and VT2 or VT4 and VT5 respectively. The first monostable M1 triggers the second through a buffer and inverter amplifier including transistor VT3 and which is preferably provided in the interests of improved stability. The buffer amplifier could, however, be dispensed with and monostable M2 connected to be triggered by voltage from the collector of VT1.

The charging current circuits for the capacitances $C_1$ and $C_2$ are respectively constituted by the two parts of a potentiometer on either side of an adjustable tap $RV_2$ on a resistance R. The potentiometer is between the points X and Y. One of its part consists of the resistances $r_1$, $R_d$ (which may be variable as indicated by the arrow $RV_1$) and resistance $R_1$ which is the part of R on one side of the tap $RV_2$, all in series. The other of the two parts of the potentiometer consists of the other part $R_2$ of R, a resistance $R_t$ (which may be adjusted as indicated by $RV_3$) and a resistance $r_2$ in series. Suitable operating voltage is applied between $+V$ and $-V_B$.

With reference to the operation of the pulse generator of FIGURE 1, and considering the first monostable circuit M1 in its static condition, transistor VT2 is maintained conductive by base current flowing through resistors $R_1$, $r_1$ and $R_d$. The base of transistor VT1, by its connection with the collector of VT2, is therefore maintained at a negative potential and the transistor VT1 is cut off. On receipt of a positive pulse at the terminal labelled "IN," the base of the transistor VT1 is driven into its conductive state, this state being maintained with transistor VT2 being cut off for a time period which is determined by the time constant of the capacitor $C_2$ and the resistors $R_1$, $r_1$ and $R_d$ in its base circuit. The triggering transistor amplified VT3 is normally cut off at the termination of this time period, transistor VT2 collector going negative as its returns to conduction for a short time determined by the time constant of the capacitor and resistor (unnumbered) in its base-emitter circuit. A positive pulse is thus generated in the collector circuit of VT3 which triggers the second monostable circuit in similar manner to the first monostable circuit with the transistor VT4 normally off and the transistor VT5 normally saturated.

An input trigger is applied on input terminal IN at a datum time $t_0$ (from which all delays are measured) as indicated adjacent said input terminal. An output pulse is obtained at the output terminal OUT with its leading edge occurring at time $t_1$, its center line at time $t_m$ and its trailing edge at time $t_2$ as indicated adjacent said output terminal.

If variation of pulse width $t_2-t_1$ without variation of the timing $(t_m-t_0)$ of the pulse center line is required $C_2$ is chosen equal to $2C_1$. Then since $$t_1-t_0 \alpha C_1(R_d+r_1+R_1)$$

and $$t_2-t_1 \alpha C_2(R_2+r_2+R_t)$$

$$t_m-t_0=(t_1-t_0)+\tfrac{1}{2}(t_2-t_1)\alpha C_1(R_d+r_1+r_2+R_1+R_2+R_t)=C_1(R_d+r_1+r_2+R+R_t)$$

In other words movement of the control $RV_2$ alone will not change $t_m-t_0$ but will only vary $t_2-t_1$ (i.e the pulse width will be varied symmetrically with respect to the pulse center line. If it is desired to vary the timing of the center line of the pulse $(t_m-t_0)$ the control $RV_1$ may be adjusted to vary the value of $R_d$ and it may be shown that this adjustment will not affect the pulse width.

If control of the leading and/or the trailing edge of the pulse independently is required $C_1$ and $C_2$ are made of the same value. Then $$(t_2-t_0)=(t_1-t_0)+(t_2-t_1)\alpha C_1(R_d+r_1+r_2+R_1+R_2+R_t)=C_1(R_d+r_1+r_2+R+R_t)$$

In other words the timing of the trailing edge of the pulse is independent of the setting of the control $RV_2$ and dependent on the setting of $RV_3$. It may be shown similarly that, by adjusting $RV_2$ the timing of the leading edge of the pulse may be adjusted independently of the setting of $RV_3$ since $$t_1-t_0 \alpha C_1(R_d+r_1+R_1)$$

It will be seen that if symmetrical variation of pulse width is all that is required the control $RV_3$ is unnecessary since $t_2-t_0$ is dependent upon $R_d$ as well as $R_t$ such that variations in $R_d$ may be employed to control the timing of the trailing edge, while the pulse width $t_2-t_1$ may be varied by varying $R_2$. The control $RV_1$ is not necessary for independent control of the leading or trailing edge since the time of the leading edge $t_1-t_0$ may be varied by variations in $R_1$ and the time of the trailing edge $t_2-t_0$ is independent of either $R_1$ or $R_2$.

As set forth hereinabove, the two charging currents which flow through the two parts of the potentiometer extending between the points X and Y on either side of the adjustable tap $RV_2$ are varied by a variation in location of the tap $RV_2$, while maintaining the sum of the reciprocals of the charging currents substantially constant.

From FIGURE 1 it will be seen that the base current of the transistor $VR_2$ is given by $$I_{b2}=\frac{V-V_{be2}}{R_1+R_d+r_1}$$

Similarly, the base current of the transistor VT5 is given by $$I_{b5}+\frac{V-V_{be5}}{R_2+R_t+r_2}$$

The sum of the reciprocals of the currents to the point of interconnection of the two charging capacitors $C_1$ and $C_2$ with the bases of the two transistors VT2 and VT5, respectively, is then $$\frac{1}{I_{b2}}+\frac{1}{I_{b5}}=\frac{R_1+R_d+r_1}{V-V_{be2}}+\frac{R_2+R_t+r_2}{V-V_{be5}}$$

For similar transistors $V_{be2}$ is substantially equal to $V_{be5}$, and $$\frac{1}{I_{b2}}+\frac{1}{I_{b5}}=\frac{R_1+R_2+R_d+R_t+r_1+r_2}{V-V_{be}}$$

The combined resistance $R_1+R_2$ is constant and the sum of the reciprocals $$\frac{1}{I_{b2}}+\frac{1}{I_{b5}}$$

is independent of the setting of the tap $RV_2$.

FIGURE 2 shows the circuit of FIGURE 1 modified for remote control. The controllable elements $$R=R_1+R_2$$

and $R_t$ are situated at the remote control point as indicated by the chain line block RC and transistors VT6 and VT7 are effectively inserted in the capacitance charging circuits as shown. The slider on the resistance R is connected to the bases of the said transistors through a suitable potential source. The points X and Y in FIGURE 2 are the same points as those so referenced in FIGURE 1 and the remainder of the embodiment of FIGURE 2 is as in FIGURE 1.

It may be shown that, in arrangement as in FIGURE 2, if $C_2=2C_1$ adjustment of $RV_2$ will again vary the pulse width symmetrically about the pulse center line and adjustment of $RV_1$ will again vary the timing of the pulse center line without changing the pulse width. Similarly it may be shown that, if $C_1$ and $C_2$ are equal in an arrangement in accordance with FIGURE 2, adjustment of $RV_2$ will vary the timing of the pulse leading edge only adjustment of $RV_3$ will vary the timing of the pulse trailing edge only.

Obviously the invention is not limited to the use of the particular forms of triggerable monostable delay circuits shown and other suitable forms of such circuit, known per se, may be employed.

We claim:

1. An adjustable pulse generator comprising a first triggerable monostable delay circuit including a capacitance having a rate of charge which determines the delay provided by said circuit; a second triggerable monostable delay circuit also including a capacitance having a rate of charge which determines the delay provided by said second circuit; and a variable potentiometer connected with both capacitances and having a part on either side of an adjustable tap thereon, current in the two monostable circuits being arranged to flow respectively through a respective part of the potentiometer, whereby adjustment of said adjustable tap varies said currents while maintaining the sum of their reciprocals substantially constant.

2. A generator as claimed in claim 1 wherein remote control is obtained, each said part of said potentiometer on either side of the adjustable tap thereon including an amplifier having a control point and said potentiometer including at least one adjustable element at a remote point, the generator further comprising means for providing an operating potential between the adjustable tap of said potentiometer and the control point of each of the amplifiers.

3. A generator as claimed in claim 1 adapted to provide a pulse having leading and trailing edges arranged about a center line of the pulse, the timing of the leading and trailing edges of which can be symmetrically varied with respect to the timing of the pulse center line and wherein the capacitance in the second monostable delay circuit is made twice the value of the capacitance in the first monostable circuit, each of said capacitances having an associated charging current circuit for providing charging currents to said capacitances, and resistances in the charging current circuits being included in a respective part of the potentiometer on either side of the adjustable tap thereon, adjustment of which varies the pulse width without varying the timing of the pulse center line.

4. A generator as claimed in claim 3 wherein an additional variable resistance, adjustment of which will adjust the timing of the pulse center line without varying the width of the pulse, is included in that part of the potentiometer through which flows the charging current for the capacitance in the first monostable delay circuit.

5. A generator as claimed in claim 1 adapted to provide a pulse having leading and trailing edges arranged about a center line of the pulse, the timing of the leading edge of which can be adjusted and wherein the value of the two capacitances, one in each monostable delay circuit, is made the same, each of said capacitances having an associated charging circuit for providing charging currents to said capacitances, and resistances in the charging current circuits being included in a respective part of the potentiometer on either side of the adjustable tap thereon, adjustment of which varies only the timing of the leading edge of the pulse.

6. A generator as claimed in claim 5 wherein an additional variable resistance, adjustment of which will adjust the timing of the trailing edge of the pulse without varying the timing of the leading edge, is included in that part of the potentiometer through which flows the charging current for the capacitance in the second monostable delay circuit.

7. A generator as claimed in claim 1 wherein the value of the capacitance in the second monostable delay circuit is equal to or twice the value of that in the first.

8. A generator as claimed in claim 1 wherein a buffer stage is provided between the two monostable delay circuits.

9. An adjustable pulse generator comprising a first triggerable monostable delay circuit including a first time delay capacitance, a second triggerable monostable delay circuit including a second time delay capacitance, first and second resistance circuit means associated with said first and second capacitances, respectively, for determining the time rate of charging of said capacitances, and single selectively operable means connected with both said first and second resistance circuit means for simultaneously altering the resistance in each of said first and second resistance circuit means without altering the total sum resistance of both said first and second resistance circuit means.

References Cited

UNITED STATES PATENTS

| | | | |
|---|---|---|---|
| 2,402,917 | 6/1946 | Miller | 328—58 XR |
| 3,223,856 | 12/1965 | Joy | 307—88.5 |
| 3,244,909 | 4/1966 | Henderson | 307—88.5 |

JOHN S. HEYMAN, *Primary Examiner.*

J. ZAZWORSKY, *Assistant Examiner.*

U.S. Cl. X.R.

328—58, 63; 307—265, 266, 267, 293